(12) United States Patent
Treue et al.

(10) Patent No.: US 10,554,587 B2
(45) Date of Patent: Feb. 4, 2020

(54) WIRELESS COMMUNICATION DEVICE FOR COMMUNICATING WITH MULTIPLE EXTERNAL DEVICES VIA A WIRELESS COMMUNICATION UNIT

(71) Applicant: Oticon A/S, Smørum (DK)

(72) Inventors: Franz Treue, Smørum (DK); Bjarne Klemmensen, Smørum (DK); Rune SØ, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 15/857,319

(22) Filed: Dec. 28, 2017

(65) Prior Publication Data

US 2018/0191641 A1 Jul. 5, 2018

(30) Foreign Application Priority Data

Dec. 29, 2016 (EP) ..................... 16207329

(51) Int. Cl.
*H04L 12/931* (2013.01)
*H04W 28/02* (2009.01)
*H04W 88/06* (2009.01)
*H01Q 1/22* (2006.01)
*H04W 84/12* (2009.01)

(52) U.S. Cl.
CPC ......... *H04L 49/602* (2013.01); *H01Q 1/2291* (2013.01); *H04W 28/0273* (2013.01); *H04W 88/06* (2013.01); *H04W 84/12* (2013.01)

(58) Field of Classification Search
CPC .... H01Q 1/2291; H04B 1/006; H04B 1/0067; H04B 1/0475; H04B 1/10; H04B 1/385; H04B 7/2123; H04B 7/2125; H04B 1/0082; H04L 49/602; H04W 28/0273; H04W 84/12; H04W 88/06; H04R 25/558; H04R 25/70; H04R 2201/107; H04R 2201/109
See application file for complete search history.

(56) References Cited

U.S. PATENT DOCUMENTS 5,712,868 A 1/1998 Stern et al.
8,879,764 B2 * 11/2014 Andersen ............. H04R 25/554
381/312

(Continued)

*Primary Examiner* — Ahmed Elallam
(74) *Attorney, Agent, or Firm* — Birch, Stewart, Kolasch & Birch, LLP

(57) ABSTRACT

A method and wireless communication device use a first processing unit to perform a first communication event within a first communication window by use of a first communication protocol, a second processing unit to perform a second communication event within a second communication window by use of a second communication protocol, and a wireless communication unit connected to a radio-frequency antenna to transmit and/or receive a packet wirelessly. The first and second processing units may perform the first and second communication events via the wireless communication unit. The second processing unit or the wireless communication unit may transmit an event signal to the first processing unit when performing the second communication event or receiving a packet, respectively, to allow the first processing unit to arrange the first communication window (or first communication event) with respect to the second communication window (or second communication event) to minimize interference.

18 Claims, 7 Drawing Sheets

(56) References Cited

U.S. PATENT DOCUMENTS

| | | | |
|---|---|---|---|
| 9,049,525 B2* | 6/2015 | Nielsen | H04R 25/554 |
| 9,749,753 B2* | 8/2017 | Petersen | H04R 25/30 |
| 9,883,298 B2* | 1/2018 | Solum | H04R 25/558 |
| 9,940,928 B2* | 4/2018 | Haubrich | G10L 15/22 |
| 2007/0086601 A1* | 4/2007 | Mitchler | H04B 1/30 |
| | | | 381/79 |
| 2008/0279163 A1 | 11/2008 | Desai | |
| 2011/0205986 A1 | 8/2011 | Medapalli | |
| 2013/0155931 A1 | 6/2013 | Prajapati et al. | |
| 2015/0341724 A1 | 11/2015 | Pedersen et al. | |
| 2016/0134742 A1* | 5/2016 | Shennib | H04M 1/72533 |
| | | | 455/420 |

* cited by examiner

WIRELESS COMMUNICATION DEVICE FOR COMMUNICATING WITH MULTIPLE EXTERNAL DEVICES VIA A WIRELESS COMMUNICATION UNIT

TECHNICAL FIELD

The disclosure relates to a wireless communication device which is not a smartphone or a cellphone configured to use a first communication protocol for performing a first communication event and a second communication protocol for performing a second communication event via a radio-frequency (RF) antenna.

BACKGROUND

In a wireless communication device where the size of the device is limited by the constraint of being wearable on an ear of a user or wearable on a user without being uncomfortable for the user to wear, multiple antennas configured for communicating packets at the same carrier frequency, such as 2.4 GHz, may be affected by internal coupling and disturbance between the antennas.

In order to solve the above problem it is known to use a switched antenna which is configured to transmit a packet configured to a protocol which is decided by a switching mean. The+ switching mean may be configured to switch between a first protocol channel and a second protocol channel. In a situation where both protocols are communicating in real time, e.g. during a telephone conversation, and where both protocols wants to transmit a audio packet at the same time, the switching mean has to decide which of the protocols should be dedicated to the antenna, and in this situation the audio packets of the none chosen protocol will be lost. The problem of losing packets is that the user which receives the audio packets will experience a poor audio quality of the telephone conversation, and the risk of reducing the quality even more may occur if both protocols wants to either transmit or receive a packet at the same time or within a time range which overlaps each other multiple consecutive times.

U.S. Pat. No. 5,712,868 A discloses a dual mode communication network comprises an antenna for communicating a first traffic channel protocol and a second traffic channel protocol, where a first communication system includes a frame structure and the first traffic channel protocol and a second communication system includes the frame structure and the second traffic channel protocol.

SUMMARY

An object of the present disclosure is to provide an improved audio quality by avoiding loss of communication packets during a real time communication of multiple protocols with the same or approximately the same carrier frequency via a single radio-frequency antenna in a wireless communication device.

A further object of the disclosure is to provide a compact wireless communication device configured to communicate multiple protocols with a single radio-frequency antenna while being able to stream stereo audio packets wirelessly between the wireless communication device and multiple external devices, such as a mobile telephone (or a smart phone), a tablet, or an intermediate streaming device.

Objects of the present disclosure are achieved by the present disclosure described in the accompanying claims and as described in the following.

An object of the present disclosure is achieved by a wireless communication device configured to use a first communication protocol for performing a first communication event and a second communication protocol for performing a second communication event, comprising; a first processing unit may be configured to perform the first communication event within a first communication window by the use of the first communication protocol; a second processing unit may be configured to perform the second communication event within a second communication window by the use of the second communication protocol; a wireless communication unit connected to a radio-frequency antenna may be configured to transmit and/or receive a packet wirelessly, and the wireless communication unit is further connected to the second processing unit, the second processing unit may be configured to perform the second communication event of the packet via the wireless communication unit, and the wireless communication unit is further connected to the first processing unit configured to perform the first communication event of the packet via the wireless communication unit. Additionally, the second processing unit or the wireless communication unit may be configured to transmit an event signal to the first processing unit when performing the second communication event or when the wireless communication unit receives a packet, respectively, and the first processing unit is configured to arrange the first communication window (or the first communication event) with respect to the second communication window (or the second communication event) based on the event signal so that the interference between the first communication window and the second communication window is minimized when the first processing unit and the second processing unit performs the first communication event and the second communication event, respectively.

An external device, such as a smartphone, may stream a packet, e.g. an audio packet (mono or stereo) or a data packet, to the wireless communication device. The wireless communication device may receive the packet via the wireless communication unit and the radio-frequency antenna. The packet may be transmitted to the wireless communication unit by using the second communication protocol, e.g. Bluetooth Low Energy or Bluetooth. The wireless communication unit may then transmit the packet to the second processing unit which is configured to communicate with the external device by using the second communication protocol. The second processing unit may then process the packet and during the processing or when received the packet the event signal may then be transmitted to the first processing unit. The first processing unit is configured to communicate to another external device, e.g. a hearing device, by using the first communication protocol. The timing of the first communication window of the first communication protocol is then arranged according to the timing of the second communication window of the second communication protocol based on the timing of the event signal. The timing of the event signal informs the first processing unit when to expect the next packet (transmitted by the external device) to be received by the second processing unit. During a period of multiple event signals received by the first processing unit, the estimation of when to expect the next packet to be received by the second processing unit is improved.

The first processing unit receives then the packet from the second processing unit and in the meantime the first processing unit has assigned the wireless communication unit to the first processing unit in such a way that the wireless communication unit and the antenna will be available for the second processing unit for receiving at least a packet, e.g. a first packet or a repeater packet which contains the same information or audio as the first packet, and in a way that the first processing unit is able to communicate the packet received from the second processing unit without any significant delay in the audio to the another external device (e.g. a hearing device).

The event signal makes the first processing unit able to synchronize or arrange the first communication window according to the second communication window in such a way that the wireless communication unit and the RF antenna are always available for the second processing unit for receiving (i.e. for performing a second communication event) a packet transmitted by an external device to the wireless communication device, and in such a way that the wireless communication unit and the RF antenna are always available for the first processing unit for transmitting (i.e. for performing a first communication event) the packet to another external device.

In a situation where the wireless communication device is part of a real time communication with an external device and another external device, the advantage of having the event signal is that the losing of packets at the wireless communication device during the switching between the first communication protocol (i.e. the communication between the wireless communication device and the another external device) and the second communication protocol (i.e. communication between the wireless communication device and the external device) will not appear will be minimized. This will result in an approved signal quality of the signal comprising the packets being transmitted by the external device to the wireless communication device.

In general, the size of the wireless communication device can be reduced since the need of having multiple antennas is not present due to the event signal.

The antenna may be an inverted-F-antenna (IFA) operating with a frequency range of between 2.4 GHz and 5.5 GHz, or 2.4 GHz and 2.485 GHz, or 2.4 GHz and 5.2 GHz, or about 2.45 GHz, or about 5.5 GHz, or about 5.1 GHz or about 5.2 GHz, or about 5.3 GHz. The advantage of combining the wireless communication device and the inverted-F-antenna is that the size of the wireless communication device can be reduced even more since one or more of the electronic components within the wireless communication device, such as the first/second processing unit, the wireless communication unit, and/or a plugin port, may be mounted on top or below the IFA.

The antenna may comprise a first antenna element, a second antenna element where a first end of the second antenna element is arranged at one end of the first antenna element and is connected thereto, and where a second end of the second antenna element is connected to a ground plane, and a third antenna element which is spaced at a specific distance apart from the second antenna element and connected to the first antenna element. The third antenna element may be connected to a feeding unit, where the feeding unit is configured to provide a current to the antenna via the third antenna element.

The first antenna element, the second antenna element and the third antenna element may be formed by one or more electrically conducting paths, a printed circuit board or a flexible printed circuit board.

The specific distance between the third antenna element and the second antenna element is determined based on the current and/or the voltage distribution along the first antenna element.

An electrical length of the first antenna element is $\lambda/4$ or $x*\lambda/4+/-\lambda/2$, where x is an odd number such as 3, 5, 7 etc.

An electrical length of the ground plane is $\lambda/4$ or $x*\lambda/4+/-\lambda/2$, where x is an odd number such as 3, 5, 7 etc.

Furthermore, the wireless communication device may comprise a plugin port, such as a USB port, and in order to reduce the size of the wireless communication device even more the antenna could be utilizing the plugin port and/or the space within the wireless communication device and around the plugin port.

The plugin port may be a USB plug.

The antenna may comprise a fourth antenna element and a fifth antenna element, where a first end of the fifth antenna element is arranged at one end of the fourth antenna element and is connected thereto, and where a second end of the fifth antenna element is connected to the first antenna element, and where the fourth antenna element is partly parallel with the first antenna element, and where the electrical length of the fourth antenna element is larger than the electrical length of the first antenna element. In this specific example, the antenna may be a dual band inverted F antenna having at least two frequency, i.e. operating frequency, where a first frequency is represented by the fourth and the fifth antenna element, and a second frequency is represented by the remaining antenna element of the internal antenna. If the fourth antenna element has a longer electrical length than the first antenna element results in that the first frequency is less than the second frequency.

The advantage of the fourth antenna element and the fifth antenna element is that the antenna is configured to operate at multiple frequency within multiple frequency ranges. In one specific embodiment, the antenna may be configured to communicate with multiple external devices using two communication protocol, where the frequency of both protocols are within a frequency range of about 2.45 GHz to about 5.5 GHz, or between 2.44 GHz to 5.5 GHz or about the frequency of 2.45 GHz or about the frequency of 5.5 GHz.

The antenna may comprise an internal parasitic element, and where the feeding unit is further configured to supply the current to the internal parasitic element via a wireless coupling, such as a magnetic coupling or a capacitive coupling.

The internal parasitic element may be positioned within the wireless communication device such that the current within the feeding unit is coupled wirelessly to the internal parasitic element.

The advantage of using the internal parasitic element is that the bandwidth of the antenna increases.

The wireless communication device may comprise a USB plug, wherein the USB plug is mounted on the first antenna element. Thereby, the size of the wireless communication device is reduced even more compared to a wireless communication device where the antenna is not part of the USB plug. Furthermore, this makes it possible to integrate the USB plug and the antenna in the same volume/space without loss of antenna efficiency nor USB functionality.

The first antenna element and/or the fourth antenna element may be part of the USB plug. In this specific example the electrical length of the first antenna element and/or the the fourth antenna element includes the electrical length of the USB plug.

The wireless communication device may be an intermediate streaming device configured to forward wirelessly a phone conversation between a smartphone and a hearing device or between any external devices. The wireless communication device is not a smartphone or a cellphone. The wireless communication device may be part of a hearing system which comprises the wireless communication device and one or more hearing devices, such as a hearing aid.

The wireless communication device may have a length between 4 cm and 12 cm, between 5 cm and 10 cm, or between 6 cm and 8 cm.

The wireless communication device may be built into a hearing device, where the hearing device is able to communicate with an external device by using the second communication protocol and to communicate with a second hearing device by using the first communication protocol. The second hearing device may be worn by the user wearing the first hearing device or the second hearing device may worn by another user.

The first processing unit and the second processing unit may both be an integrated circuit mounted on a printed circuit board. Both processor units may be combined into a single integrated circuit.

The first communication protocol and the second communication protocol may both be Bluetooth or Bluetooth Low energy or any short range communication protocol. The first communication protocol and the second communication protocol may be different protocols operating at two separate carrier frequencies which may lead to critical interferences if the antennas of both protocols are positioned within a short distance.

The first communication protocol and the second communication protocol are operating within an operating frequency or carrier frequency which is the same for both protocols. The operating frequency or the carrier frequency may be between 2.4 GHz and 5.5 GHz, or 2.4 GHz and 2.485 GHz, or 2.4 GHz and 5.2 GHz, or about 2.45 GHz, or about 5.5 GHz, or about 5.1 GHz or about 5.2 GHz, or about 5.3 GHz.

The wireless communication device may be configured to communicate more than two communication protocols having the same carrier frequency.

The first communication event may be a transmission and/or receive of a packet from an external device, such as a hearing device or a mobile telephone, and the second communication event may be a transmission and/or receive of a packet from an external device, such as mobile telephone or another hearing device. So in general, a communication event refers to a transmission or receive of a packet. The packet may comprise data and/or audio.

The wireless communication unit may be configured to receive and transmit data via an antenna to an external device. The wireless communication unit may comprise a radio-frequency (RF) switch connected to the antenna and the first processing unit and the second processing unit. The RF switch may be configured to switch between transmitting and receiving of packets transmitted by either the first or the second processing unit or an external device. The RF switch may be a MOSFET based switch, such as a CMOS RF switch.

The wireless communication unit may be mastered by the first processing unit. The first processing unit may assign the RF switch to either the second processing unit or the first processing unit or even a third or other processing units.

The first processing unit may be configured to assign the wireless communication unit to either the first processing unit or the second processing unit. The first processing unit informs the second processing unit via the wireless communication unit or another connection between the two processing unit that the wireless communication unit has been assigned to the first processing unit or another processing unit. Thereby, the second processing unit will not start trying to identify the issue(s) of why it does not receive any packets, instead the second processing unit will lower it's power consumption. The same goes for the first processing unit and/or other processing units within the wireless communication device.

The first processing unit may be configured to assign the wireless communication unit to either the first processing unit or the second processing unit based on the arrangement of the first communication window with respect to the second communication window.

The first processing unit is configured to assign the wireless communication unit to either the first processing unit or to the second processing unit according to a prioritization scheme, wherein the prioritization scheme is configured to prioritize the first communication event and the second communication event according to the contain of the packet of the first communication event and the contain of the event signal or a packet of the second communication event transmitted to the first processing unit.

The wireless communication unit may be part of the first processing unit or the second processing unit. Alternatively, the wireless communication unit and both processing units may be combined into one unit.

The wireless communication unit may comprise an evaluation processing unit which may be configured to evaluate a packet which is transmitted by an external device, such as a cellphone, and received by the antenna of the wireless communication device. The evaluating of the packet is used for selecting which of the first or second processing unit the packet should be transmitted to.

The event signal transmitted by the second processing unit to the first processing unit may be a bit signal, where a high bit signal (i.e. '1') may indicate a packet. The event signal may be transmitted via a dedicated connection between the two processing units or via the wireless communication unit. The advantage of transmitting the event signal is mentioned above.

Alternatively, the event signal may be generated by the wireless communication unit. The wireless communication unit knows when the packet is to be received by the second processing unit, and thereby, the wireless communication unit may generate the event signal instead of the second processing unit and transmit the event signal to the first processing unit. The advantage of having the wireless communication unit to determine the event signal is that multiple processing units, i.e. more than two processing units, are allowed to use the same wireless communication unit and the antenna. By allowing the wireless communication unit to determine the event signal and transmit it to the first processing unit removes the risk of having multiple event signals overlapping or interfering, and furthermore, the event signal may be extended to include several bits for describing the type and contain of a packet relating to the respective event signal. Additional, the wireless communication unit may be more flexible to adding more processing units configured to a wireless communication protocol having the same or nearly the same carrier frequency and still using a single antenna.

The arrangement of both communication windows is determined by the event signal and the timing of the event signal according to a predetermined time period. The arrangement of both communication windows means that the communication windows are shifted in time such that the packets to be transmitted in the first communication window are allowed and the needed packets to be transmitted or received within the second communication window are always allowed. For example, the first communication window may be 10 ms wide and the second communication window may be 7.5 ms wide. A primary group of packets within the first communication window may be located within the first 2.5 ms, and a first secondary group of packets may be located within the first 2 ms of the second communication window, and a second secondary group of packets may be located within the last 2 ms of the second communication window. In one scenario, the two communication windows may be arranged such that the first group of packets overlaps the first secondary group of packets. In this scenario, when the wireless communication unit is assigned to the first processing unit the primary group of packets are allowed to be transmitted to an external device and when the wireless communication unit is assigned to the second processing unit only the second secondary group of packets will be received by the wireless communication unit.

The arrangement of the communication windows may be similar to synchronizing the communication windows with a certain time offset such that the communication events of both windows can be performed.

The timing of the communication windows is fixed during the communication events of both communication windows.

The precision of the arrangement of the windows depends on the synchronization between an internal crystal oscillator of the wireless communication device and another crystal oscillator of an external device transmitting a packet to the second processing unit. The synchronization is based on the timing of the event signal. The first processing unit may initiate a timer when receiving an even signal and the timer is configured to count a time period or a dynamic time period depending on the protocol relative to the event signal. The first processing unit is further configured to set a time range in dependence of the time period. The timer is reset after each time period or when receiving an event signal. The first processing unit is able to detect an event signal within the time range only, and after each received event signal the first processing unit determines a time offset between a receive time of the event signal and the time period. The first processing unit may synchronize the crystal oscillator such that the offset is zero or average zero after each detected event signals. Alternatively, the first processing unit may initiate the synchronization after at least 5 to 8 offsets have been determined consecutively, i.e. after the first processing unit has detected an event signal in 5 to 8 consecutive time periods. Then, if not receiving an event signal the timer will stop counting and restarting when receiving a packet again.

When the crystal oscillator is synchronized to the another crystal oscillator the wireless communication device is then able to arrange the communication windows such that both communication windows are allowed to perform the respective communication events. The interference between the two communication windows are then minimized or reduced to zero.

The first processing unit may be configured to perform the arranging of the first communication window with respect to the second communication window by; receiving at the first processing unit the event signal transmitted by the second processing unit; initiating a timer in the first processing unit based on the event signal. The timer may be configured to count a predetermined time period; setting a time range in dependence of the time period; determining whether the event signal is received within the time range; determining a time offset between a receive time of the event signal and the time period, and synchronizing continuously a crystal oscillator to the time offset such that in average the offset will be minimized, and arranging at the first processing unit the first communication window in relation to the second communication window such that the interference between the first communication window and the second communication window is minimized or reduced to zero.

The advantage of including the synchronization is that the first processing unit will then be able to adjust a crystal oscillator of the first processing unit to a crystal oscillator of the external device configured to transmit the packets to the wireless communication device. The synchronization improves then the stability of the communication between the first processing unit and a first external device, such as a hearing device, and communication between the second processing unit and a second external device, such as a cellphone. The improves stability results in an improved audio quality of both communications since the number of packets being lost during the communications are reduced or minimized to approximately none packet loss.

The wireless communication device may comprise one or more microphones, wherein the first processing unit is connected to the one or more microphones for generating a packet to be transmitted to the second processing unit, and the second processing unit is configured to decode the packet and transmit the packet via the wireless communication unit and the antenna to an external device if the wireless communication unit has been assigned to the second processing unit.

The first processing unit may receive a command from an external device or via a user interface on the wireless communication device which then configures the wireless communication device into different communication modes. In a first communication mode both processing units are configured to perform the communication events when receiving a packet, i.e. the wireless communication device is configured to use the first communication protocol for performing the first communication event and the second communication protocol for performing the second communication event. In a second communication mode only the first processing unit is configured to perform the first communication event and other events relating to the microphones.

In the second communication mode4, the second processing unit is turned off or the wireless communication unit will never be assigned to the second processing unit. Thereby, the wireless communication device acts like a remote microphone system to a hearing device. The wireless communication device may be attached to a certain person and the wireless communication device will then capture the voice of that user via the microphones and transmit the voice signals to a hearing device worn by a hearing impaired.

The advantage of having a wireless communication device which is able to switch between the above mentioned communication modes is that the user will experience a more flexible hearing system which includes the wireless communication device and a hearing device.

The second processing unit may receive the packet from the wireless communication unit, and the second processing unit may encode the packet by for example using an I2S encoder and transmits the encoded packet to an I2S decoder of the first processing unit. Thereafter, the decoded packet is then transmitted to an encoder of the first processing unit. The encoder may be an G.722 including packet loss concealment (PLC). The encoder may even be a combination of G.722 encoder, PLC and a Bluetooth audio codec (for example for Bluetooth Low Energy 5.1).

The second processing unit may be configured to communicate with multiple protocols having the same carrier frequency or operating frequency. The second processing unit is configured to perform the second communication event within the second communication window by the use of the second communication protocol. The second processing unit may be further configured to perform a third communication event within a third communication window by the use of a third communication protocol. The first processing unit is configured to perform the first communication event within the first communication window by the use of the first communication protocol. In this example, a first communication link may be established between the first processing unit and an external device, such as a hearing device, where the communication link for the first communication protocol is a one-directional communication link from the wireless communication device to the external device. A second communication link for the second communication protocol is a bi-directional communication link established between the second processing unit and another external device, such as a mobile phone. A third communication link for the third communication protocol is a bi-directional communication link established between the first processing unit and the external device, such as the hearing device. The first and the second communication link are used for communicating audio packets. The wireless communication device is using the third communication link for controlling whether the external device, i.e. the hearing device, is receiving the audio packets. The external device may transmit an acknowledgement when receiving a packet from the wireless communication device via the third communication link. If the wireless communication device does not receive an acknowledgement the wireless communication device stops immediately the transmission of the audio packets. This will lead to an improved power consumption of the wireless communication device.

The carrier frequency and the operating frequency are the same.

The wireless communication device may comprise other processing units, wherein the first processing unit is configured to arrange the first communication window with respect to the second communication window and one or more other communication windows of other communication protocols of other processing units, wherein the one or more other communication protocols are operating within an operating frequency which is the same as for both the first communication protocol and the second communication protocol.

Thereby, the wireless communication device may be configured to communicate with multiple communication protocols having the same operating frequency simultaneously or in parallel.

Another object of the present disclosure is achieved by a method for arranging a first communication window of a first communication protocol of a first processing unit and a second communication window of a second communication protocol of a second processing unit when transmitting or receiving a packet at a radio-frequency antenna connected to a wireless communication unit, and the wireless communication unit is further connected to the first processing unit and the second processing unit, wherein the method comprising;
  performing at a second processing unit the second communication event within a second communication window by the use of the second communication protocol,
  transmitting an event signal at the second processing unit to the first processing unit,
  arranging at the first processing unit the first communication window with respect to the second communication window based on the event signal so that the interference between the first communication window and the second communication window is minimized when the first processing unit and the second processing unit performs the first communication event and the second communication event, respectively.

The first processing unit may be configured to perform the arranging of the first communication window with respect to the second communication window by;
  receiving at the first processing unit the event signal transmitted by the second processing unit,
  initiating a timer in the first processing unit based on the event signal, where the timer is configured to count a predetermined time period,
  setting a time range in dependence of the time period,
  determining whether the event signal is received within the time range,
  determining a time offset between a receive time of the event signal and the time period such that in average the offset will be minimized, and
  synchronizing continuously a crystal oscillator to the time offset, and
  arranging at the first processing unit the first communication window in relation to the second communication window such that the interference between the first communication event and the second communication event is minimized.

The method may include receiving at the second processing unit the packet transmitted by the wireless communication unit, and wherein the second processing unit transmits via a first decoder of the second processing unit the packet to a second decoder of the first processing unit.

The method may further include assigning at the first processing unit the wireless communication unit to either the first processing unit or the second processing unit.

The method may additionally include that the first processing unit is configured to assign the wireless communication unit to either the first processing unit or the second processing unit based on the arrangement of the first communication window with respect to the second communication window.

The method may further include that the first processing unit is configured to assign the wireless communication unit to either the first processing unit or to the second processing unit according to a prioritization scheme, wherein the prioritization scheme is configured to prioritize the first communication event and the second communication event according to the contain of the packet of the first communication event and the second communication event.

A further object of the present disclosure is achieved by a communication system including the wireless communication device and a hearing device and a mobile phone, wherein the first processing unit is configured to communicate with the hearing device via the first communication link configured to the first communication protocol; the second processing unit is configured to communicate with the mobile phone via the second communication link configured to the second communication protocol.

Additionally, the system may be configured to communicate to the hearing device via the third communication link configured to the third communication link.

The first communication protocol may be a customized Bluetooth low energy protocol, the second communication protocol may be a second customized Bluetooth low energy protocol or classic Bluetooth, and the third communication protocol may be a third Bluetooth low energy protocol or classic Bluetooth low energy protocol.

The operating frequency may be between 2.4 GHz and 5.5 GHz, 2.0 GHz and 2.45 GHz or 5.0 GHz and 6.5 GHz.

The first processing unit is configured to assign the wireless communication unit to either the first processing unit or to the second processing unit according to a prioritization scheme, wherein the prioritization scheme is configured to prioritize the first communication event and the second communication event according to the contain of the packet of the first communication event and the contain of the event signal, or according to the contain of the packet of the first communication event and a packet of the second communication event transmitted to the first processing unit.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
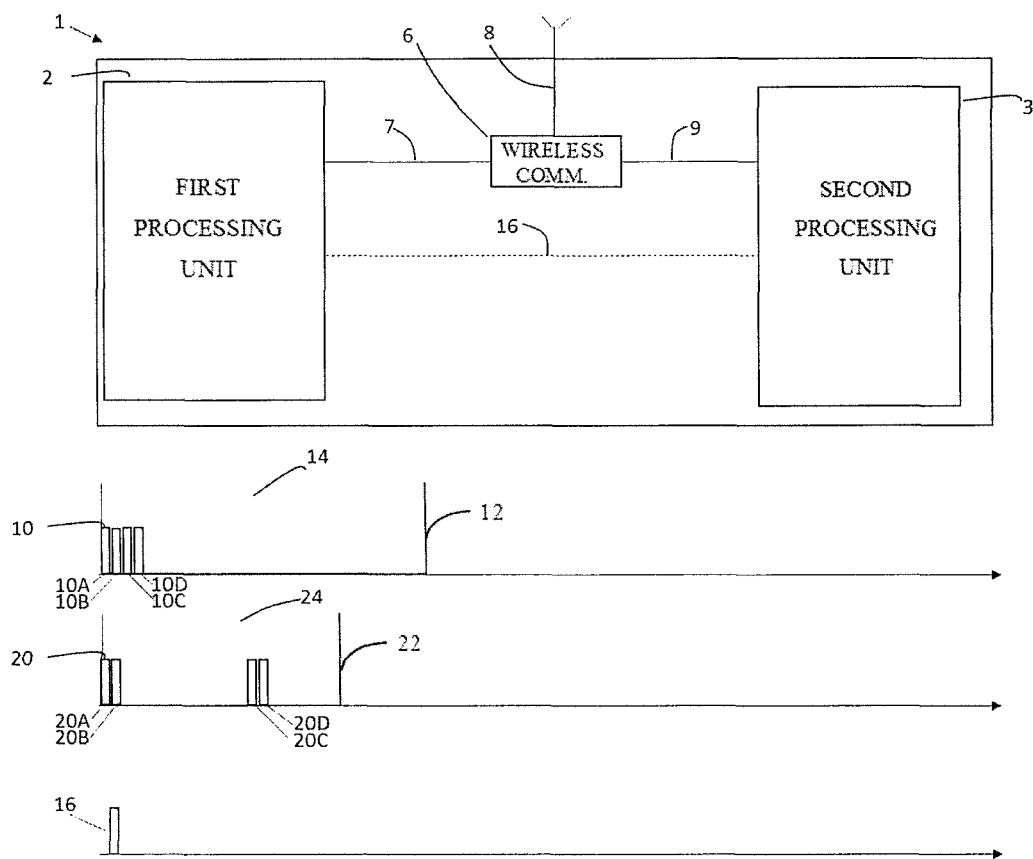
FIG. 1, illustrates an example of a wireless communication device.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals or with a receiver/loudspeaker arranged close to or in the ear canal such as in a Behind-the-Ear type hearing aid or a Receiver-in-the Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A hearing device may be part of a "hearing system", which refers to a system comprising one or two hearing devices, disclosed in present description, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follows.

FIG. 1 illustrates an example of a wireless communication device 1 comprising a first processing unit 2, a second processing unit 3 and a wireless communication unit 6 connected to a radio frequency (RF) antenna 8. The first processing unit is configured to perform a first communication event 10 within a first communication window 12 by the use of a first communication protocol 14. The second processing unit 3 is configured to perform a second communication event 20 within a second communication window 22 by the use of the second communication protocol 24. The wireless communication unit 6 is configured to transmit and/or receive a packet wirelessly, and the wireless communication unit 6 further has a connection 9 to the second processing unit 3. The second processing unit 3 is configured to perform the second communication event 20 of the packet via the wireless communication unit 6. The wireless communication unit 6 further has a connection 7 to the first processing unit 2, which is configured to perform the first communication event 10 of the packet via the wireless communication unit 6. The second processing unit 3 is configured to transmit an event signal 16 to the first processing unit 2 when performing the second communication event 20. The first processing unit 2 is configured to arrange the first communication window 12 with respect to the second communication window 22 based on the event signal 16 so that the interference between the first communication window 12 and the second communication window 22 is minimized when the first processing unit 2 and the second processing unit 3 performs the first communication event 10 and the second communication event 20, respectively.

In this particular example the first communication protocol 14 and the second communication protocol 24 are operating within an operating frequency which is the same for both protocols. The operating frequency may be between 2.4 GHz and 8 GHz, or 2.4 GHz and 2.485 GHz, or 2.4 GHz and 5.2 GHz, or about 2.45 GHz, or about 5.0 GHZ, or about 5.1 GHZ or about 5.2 GHz, or about 5.3 GHz.

Figure 2:
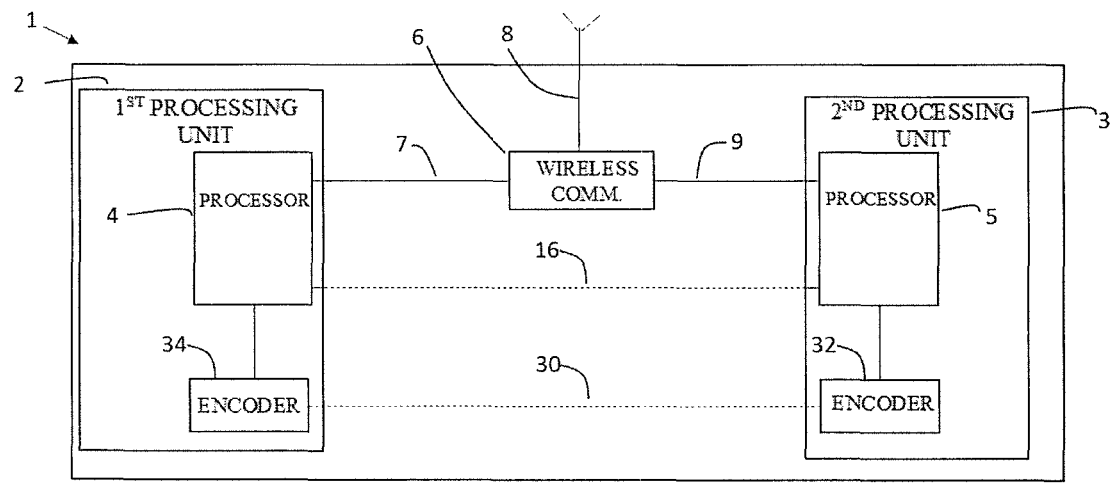
FIG. 2, illustrates another example of the wireless communication device.

FIG. 2 illustrates an example of the wireless communication device 1 where the second processing unit 3 may receive a packet from the wireless communication unit 6, and the second processing unit 3 may encode 32 the packet by for example using an I2S encoder 32 and transmits 30 the encoded packet to the first processing unit 2 which is then configured to decode 34 the encoded packet. The first processing unit 2 is further configured to encode 34 the decoded packet. The encoding 34 of the decoded packet is provided by using a G.722 encoder 34. The encoded packet is then transmitted to the processor 4 and transmitted to the wireless communication unit 6. The second processing unit 3 comprises a processor 5 configured to process the packet received from an external device via the wireless communication unit 6 or from the first processing unit 2.

Figure 3:
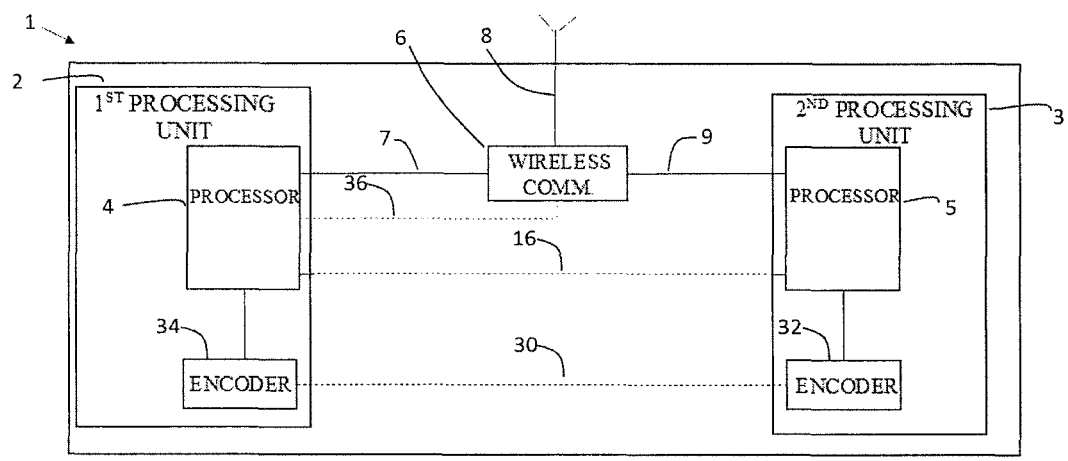
FIG. 3, illustrates a further example of the wireless communication device.
Figure 3:
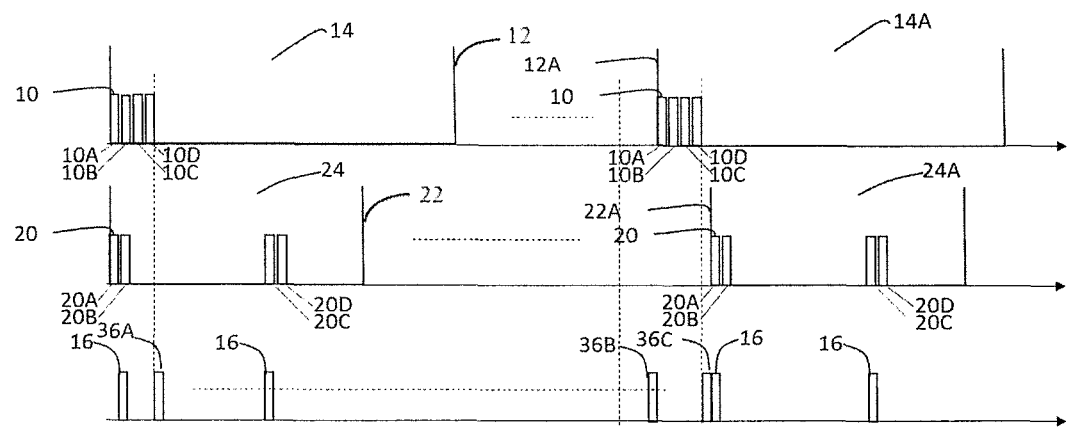

FIG. 3 illustrates an example of the wireless communication device 1 where the first processing unit 2 is configured to assign 36 the wireless communication 6 to either the first processing unit 2 or the second processing unit 3. The first processing unit 2 is configured to assign the wireless communication unit 6 to either the first processing unit 2 or the second processing unit 3 based on the arrangement of the first communication window 12 with respect to the second communication window 22.

In this particular example, the first communication window 12 comprises stereo audio packets, i.e. a first packet 10A comprising audio for a left audio channel and a repeater 10B of the first packet 10A, and a second packet 10C comprising audio for a right audio channel and a repeater 10D of the second packet 10C. The second communication window 22 comprises a first group of packets (20A, 20B) containing audio and a repeater of the packets (20C, 20D). The first communication protocol and the second communication protocol are both based on Bluetooth. Both communication windows are repeated (12A, 22A) multiple times illustrating a real time communication scenario with e.g. a mobile phone and/or a hearing device(s).

The arrangement of both the first communication windows (12, 12A) and the second communication windows (22, 22A) is determined by the event signal 16 and the timing of the event signal 16. In this particular example, the first processing unit 2 is assigned to the wireless communication unit 6, and the communication windows (12, 22) are arranged such that the packets (10A-10D) to be transmitted in the first communication window 12 are allowed. The second processing unit 3 transmits an event signal 16 after the first packet (20A, 20C) of both the first group and the repeaters within the second communication windows (22, 22A). The first processing unit 2 is configured to arrange the communication windows (12, 12A, 22, 22A) based on the event signals of either the first group or of the repeater of the second communication windows (22, 22A).

After transmitting the packets (10A-10D) within the first communication window 12 the first processing unit 2 assigns 16 the wireless communication unit 6 to the second processing unit 3 and reclaim the wireless communication unit 6 just before the timing of the transmission of the packets (10A-10D) within the first processing window 12A.

In the second communication window 22 the first group are not allowed to be received but only the repeaters (20C, 20D) of the first group. In the subsequent second communication window 22A the first group of packets (20A, 20B) are allowed to be received by the second processing unit 3.

Figure 4:
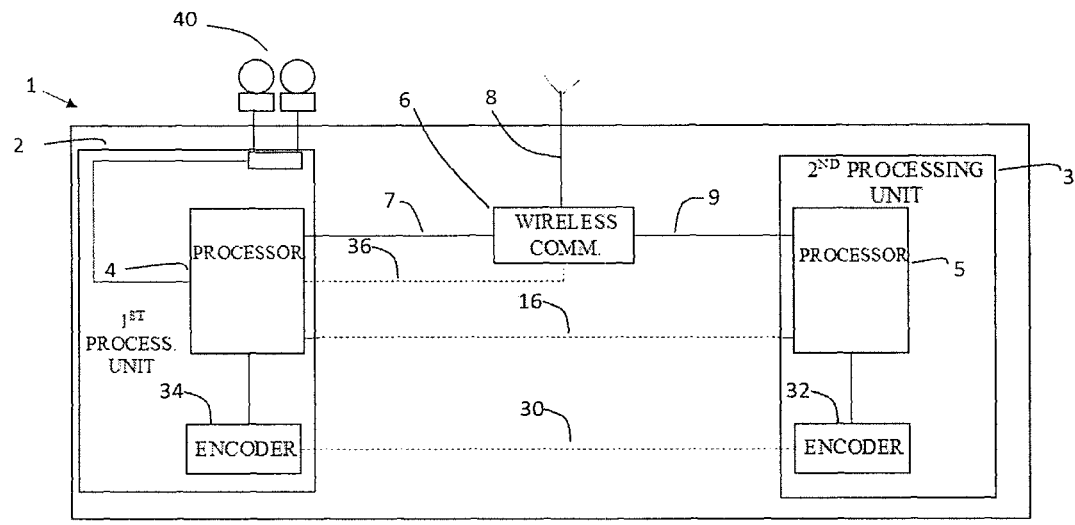
FIG. 4, illustrates another example of the wireless communication device including microphones.

FIG. 4 illustrates an example of the wireless communication device 1 including optionally two microphones 40 connected to the processor 4 of the first processing unit 2. When the user of the device 1 starts to talk the microphones 40 capture the voice sounds, and the voice sounds are then transmitted to the processor 4 of the first processing unit 2. The first processing unit 2 is then configured to transmit the voice sound in packets to the processor 5 of the second processing unit 3, and the processor 5 is then configured to transmit the packets to another decoder (not shown) before transmitting the packets to for example a cellphone (i.e. a mobile phone).

Figure 5:
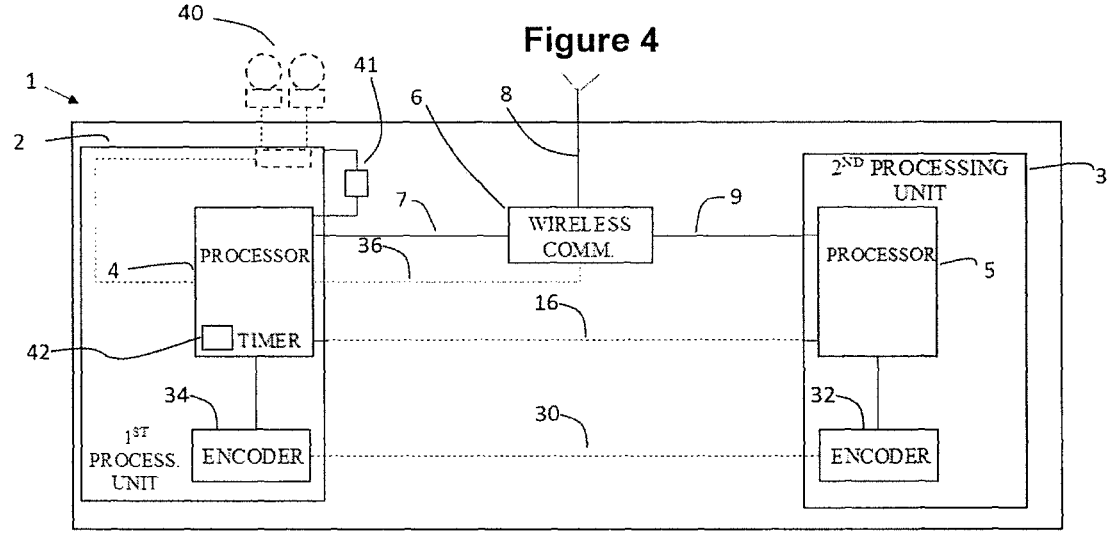
FIG. 5, illustrates an example of the wireless communication device.
Figure 5:
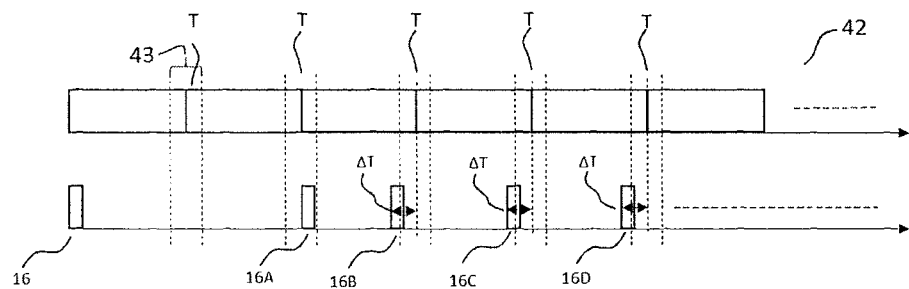

FIG. 5 illustrates an example of the wireless communication device 1 including a crystal oscillator 41 and a timer 42. The arrangement of each corresponding set of first and second communication windows (12 and 22 or 12A and 22A) is determined by the event signal 16 and the timing of the event signal 16 according to a predetermined time period T. The arrangement of each corresponding set of first and second communication windows (12 and 22 or 12A and 22A) means that the first and second communication windows (12 and 22 or 12A and 22A) are shifted in time such that the packets to be transmitted in the first communication window (12 or 12A) are allowed and the needed packets to be transmitted or received within the second communication window (22 or 22A) are always allowed. For example, the first communication window (12 or 12A) may be 10 ms wide and the second communication window (22 or 22A) may be 7.5 ms wide. A primary group of packets (10A-10D) within the first communication window (12 or 12A) may be located within the first 2.5 ms, and a first secondary group of packets (20A, 20B) may be located within the first 2 ms of the second communication window (22 or 22A) and a second secondary group of packets (20C, 20D) may be located within the last 2 ms of the second communication window (22 or 22A). In one scenario, the first and second communication windows (12 and 22 or 12A and 22A) may be arranged such that the first group of packets (10A-10D) overlaps the first secondary group of packets (20A, 20B). In this scenario, when the wireless communication unit 6 is assigned to the first processing unit 2 the primary group of packets (10A-10D) are allowed to be transmitted to an external device and when the wireless communication unit 6 is assigned to the second processing unit 3 only the second secondary group of packets (20C, 20D) will be received by the wireless communication unit 6.

The arrangement of each corresponding set of first and second communication windows (12 and 22 or 12A and 22A) may be similar to synchronizing the communication windows with a certain time offset between the windows (12 and 22 or 12A and 22A) such that the communication events (10A-10D, 20A-20D) of both windows (12 and 22 or 12A and 22A) can be performed.

The timing of the communication windows is fixed during the communication events of both communication windows.

The precision of the arrangement of corresponding set of first and second communication windows (12 and 22 or 12A and 22A) depends on the synchronization between the internal crystal oscillator 41 of the wireless communication device 6 and another crystal oscillator (not shown) of an external device (not shown) transmitting a packet to the second processing unit 3. The synchronization is based on the timing of the event signal 16. The first processing unit 2 may initiate the timer 42 when receiving an event signal 16 and the timer 42 is configured to count a time period T or a dynamic time period T depending on the protocol relative to the event signal 16. The first processing unit 2 is further configured to set a time range 43 in dependence of the time period T. The timer is reset after each time period T or when receiving an event signal (16A-16D). The first processing unit 2 is able to detect an event signal (16A-16D) within the time range 43 only, and after each received event signal (16A-16D) the first processing unit 2 determines a time offset $\Delta T$ between a receive time of the event signal and the time period T. The receive time may be the time of when the edge of the event signal goes high or low. The first processing unit 2 may synchronize the crystal oscillator 41 such that the offset $\Delta T$ is zero or average zero after each detected event signals (16A-16D). Alternatively, the first processing unit 2 may initiate the synchronization after at least 5 to 8 offsets $\Delta T$ have been determined consecutively, i.e. after the first processing unit 2 has detected an event signal (16A-16D) in 5 to 8 consecutive time periods T. Then, if not receiving an event signal 16 the timer will stop counting and restarting when receiving a packet again.

When the crystal oscillator 41 is synchronized to the another crystal oscillator the wireless communication device is then able to arrange each corresponding set of first and second communication windows (12 and 22 or 12A and 22A) such that both communication windows (12 and 22 or 12A and 22A) are allowed to perform the respective communication events (10A-10D, 20A-20D). The interference between the first and second communication windows (12 and 22 or 12A and 22A) are then minimized or reduced to zero.

Figures 6A, 6B, 6C:
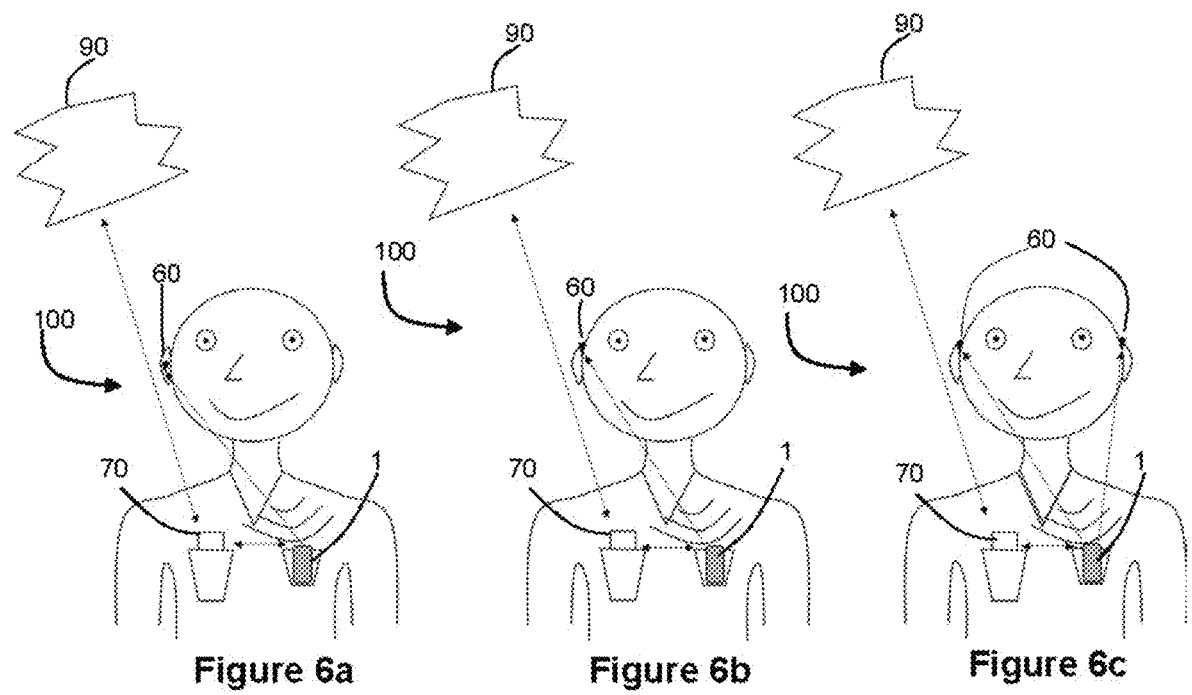
FIG. 6a-6c, illustrate an example of a communication system.

FIG. 6a-6c illustrate a communication system 100 including the wireless communication device 1 and a hearing device 60 and a mobile phone 70, wherein the first processing unit 2 is configured to communicate with the hearing device 60 via the first communication link configured to the first communication protocol 14. The second processing unit 3 is configured to communicate with the mobile phone 70 via the second communication link configured to the second communication protocol 24. In FIG. 6a, the hearing device 60 is a Behind-the-ear hearing aid, and in FIG. 6b, the hearing device 60 is an In-The-Ear hearing aid, a Receiver-In-The-Ear hearing aid or a cochlear hearing aid. In FIG. 6c, the hearing device 60 is a binaural hearing system where both hearing aids are configured to communicate with the first processing unit 2, or that only a first hearing aid is configured to communicate with the wireless communication device 1 and the first hearing aid is configured to forward the relevant packets to a second hearing aid. Both the first hearing aid and the second hearing aid are part of the binaural hearing system.

Figure 7:
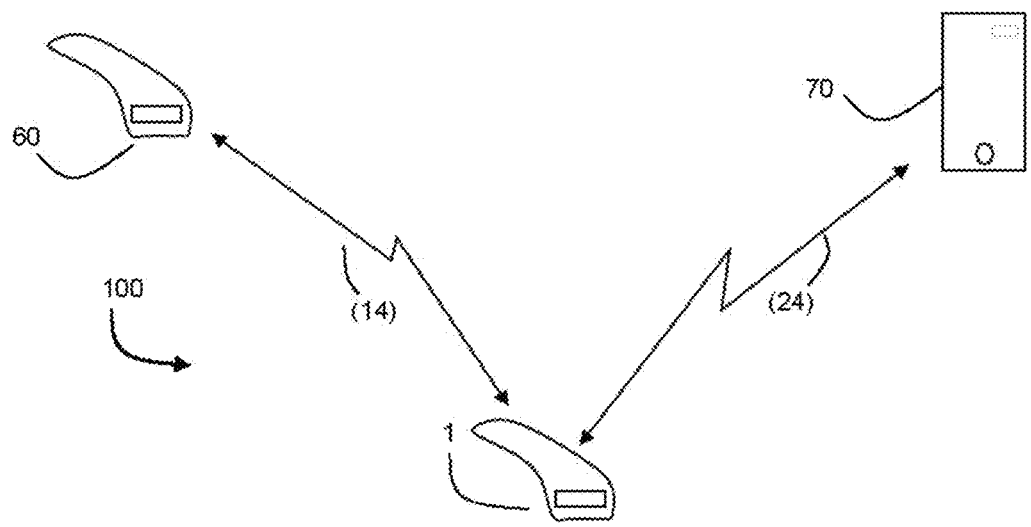
FIG. 7, illustrates another example of the communication system.

FIG. 7 illustrates an example of the communication system 100 where the wireless communication device 1 is a hearing device, such as a Behind-the ear hearing aid, an In-The-Ear hearing aid, a Receiver-In-The-Ear hearing aid or a cochlear hearing aid. In this particular example, the first processing unit 2 is configured to communicate with a second hearing device 60, and the second processing unit 2 is configured to communicate with a mobile phone 70.

Figure 8A:
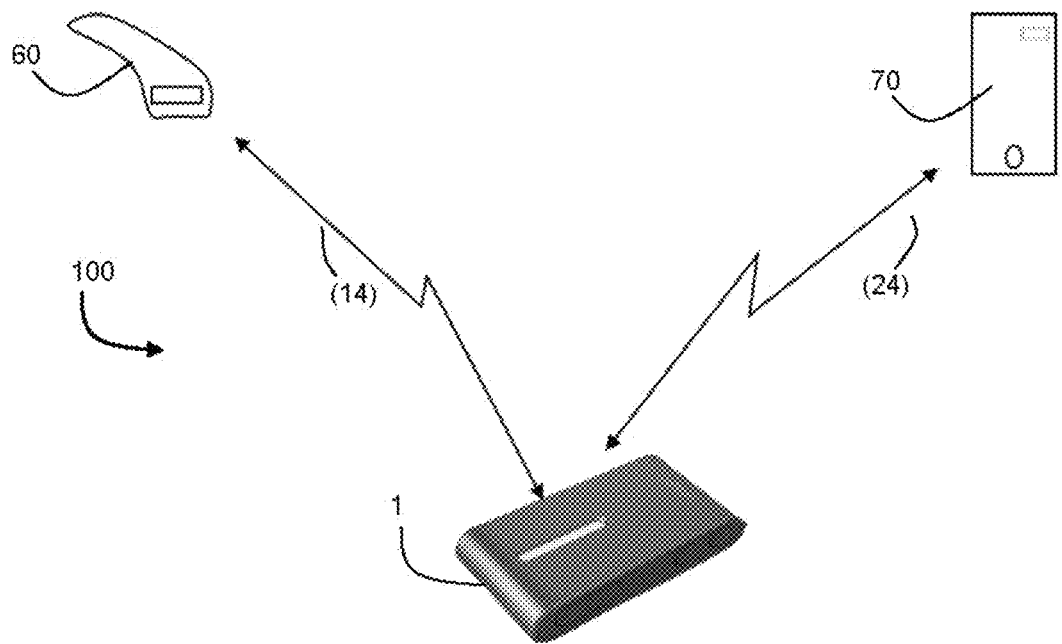
FIG. 8a-8b, illustrate further example of the communication system.

FIG. 8a illustrate a similar example as in FIG. 7, however, the wireless communication device 1 is an intermediate streaming device configured to be attached to the hearing device user or a user which is not hearing impaired.

Figure 8B:
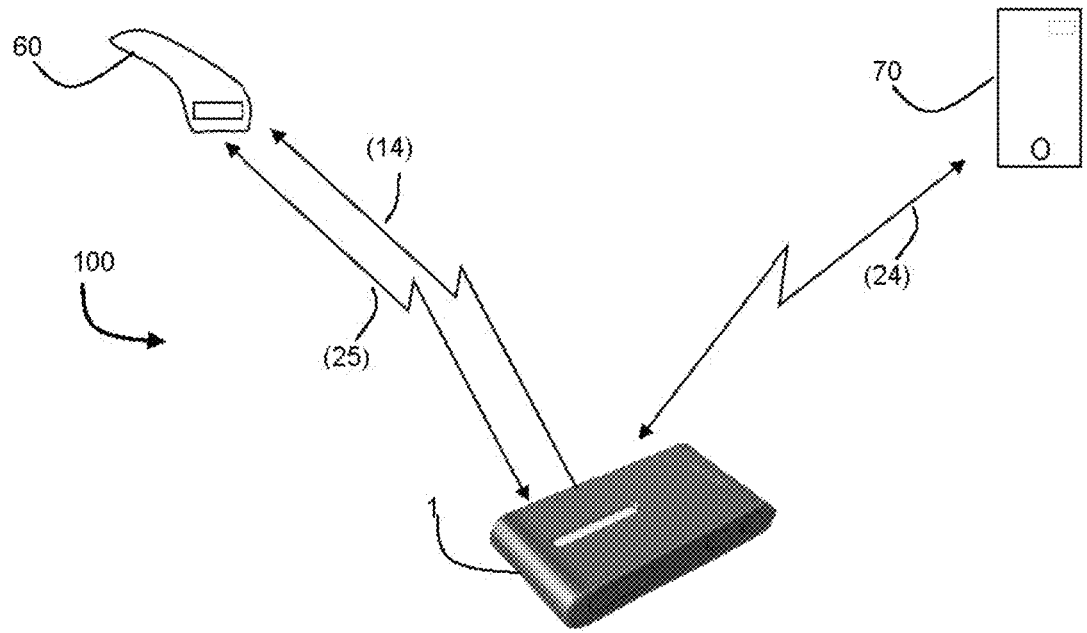

FIG. 8b illustrates an example of the communication system 100 where the second processing unit 3 is configured to communicate with multiple protocols having the same carrier frequency or operating frequency. The second processing unit 2 is configured to perform the second communication event (20A, 20B, or 20C, 20D) within the second communication window 22 by the use of the second communication protocol 24. The second processing unit 3 may be further configured to perform a third communication event within a third communication window by the use of a third communication protocol. The first processing unit 2 is configured to perform the first communication event (10A-10D) within the first communication window 12 by the use of the first communication protocol 14. In this example, a first communication link (14) may be established between the first processing unit and an external device, such as a hearing device 60, where the communication link (14) for the first communication protocol 14 is a one-directional communication link from the wireless communication device 1 to the external device 60. A second communication link (24) for the second communication protocol 3 is a bi-directional communication link established between the second processing unit 3 and another external device 70, such as a mobile phone. A third communication link (25) for the third communication protocol is a bi-directional communication link established between the second processing unit 3 and the external device 60, such as the hearing device. The first (14) and the second communication link (24) are used for communicating audio packets. The wireless communication device 1 is using the third communication link (25) for controlling whether the external device 60 is receiving the audio packets. The external device 60 may transmit an acknowledgement when receiving a packet from the wireless communication device 1 via the third communication link (25). If the wireless communication device 1 does not receive an acknowledgement, the wireless communication device 1 stops immediately the transmission of the audio packets. This will lead to an improved power consumption of the wireless communication device 1.

Figure 9:
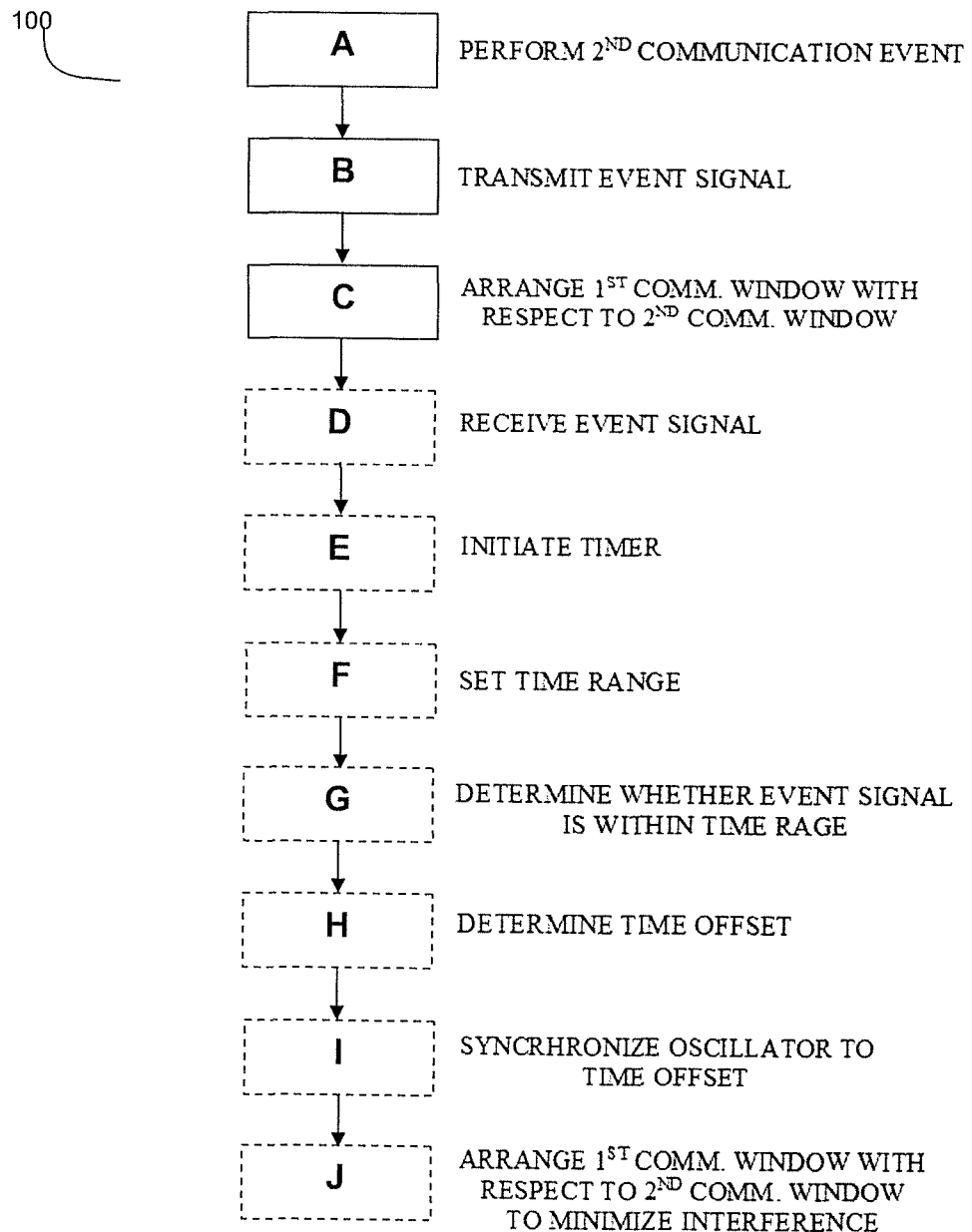
FIG. 9, illustrates a flow diagram of a method.

FIG. 9 illustrates a method 100 for arranging a first communication window 12 of a first communication protocol 14 of a first processing unit 2 and a second communication window 22 of a second communication protocol 24 of a second processing unit 3 when transmitting or receiving a packet at a radio-frequency antenna 8 connected to a wireless communication unit 6, and the wireless communication unit 6 is further connected to the first processing unit 2 and the second processing unit 3. The method 100 comprises;

Step A: performing at a second processing unit 3 the second communication event 20 within a second communication window 22 by the use of the second communication protocol 24, Step B: transmitting an event signal 16 at the second processing unit 3 to the first processing unit 2, Step C: arranging at the first processing unit 2 the first communication window 12 with respect to the second communication window 22 based on the event signal 16 so that the interference between the first communication window 12 and the second communication window 22 is minimized when the first processing unit 2 and the second processing unit 3 performs the first communication event 10 and the second communication event 20, respectively.

The method comprises optionally steps, such as:

Step D: receiving at the first processing unit 2 the event signal 16 transmitted by the second processing unit 3, Step E: initiating a timer 42 in the first processing unit 2 based on the event signal 16, where the timer 42 is configured to count a predetermined time period T, Step F: setting a time range in dependence of the time period, Step G: determining whether the event signal is received within the time range 43, Step H: determining a time offset ΔT between a receive time of the event signal and the time period T such that in average the offset ΔT will be minimized, and Step I: synchronizing continuously a crystal oscillator 41 to the time offset ΔT, and Step J: arranging at the first processing unit 2 the first communication window 12 in relation to the second communication window 22 such that the interference between the first communication event 10 and the second communication event 20 is minimized.

Figure 10:
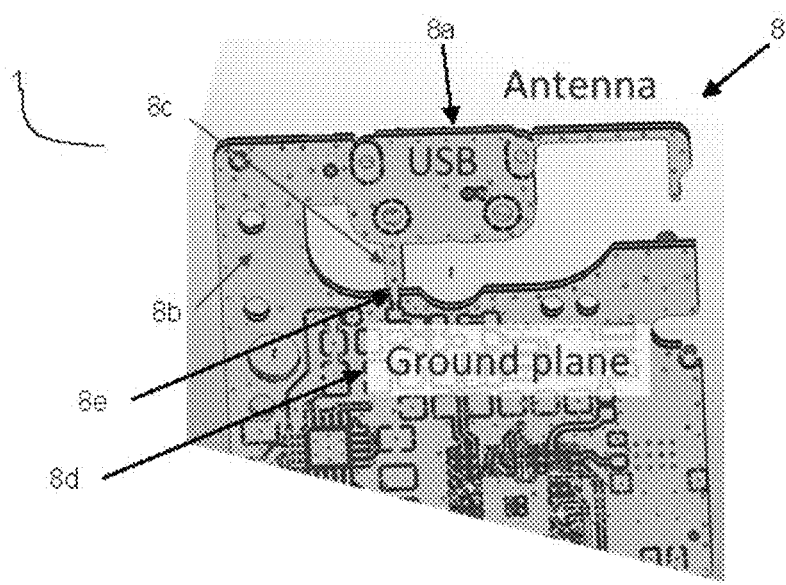
FIG. 10 illustrates an example of an antenna within the wireless communication device.

FIG. 10 illustrates an example of the antenna 8 within the wireless communication device 1, wherein the antenna 8 is an inverted-F-antenna 8. The antenna 8 may comprise a first antenna element 8a, a second antenna element 8b where a first end of the second antenna element 8b is arranged at one end of the first antenna element 8a and is connected thereto, and where a second end of the second antenna element 8c is connected to a ground plane 8d, and a third antenna element 8c which is spaced at a specific distance apart from the second antenna element 8b and connected to the first antenna element 8a. The third antenna element 8c may be connected to a feeding unit 8e, where the feeding unit 8e is configured to provide a current to the antenna 8 via the third antenna element 8c.

The invention claimed is:

1. A wireless communication device configured to use one or more communication protocols for performing a first communication event and for performing a second communication event, comprising:
 a first processor configured to perform the first communication event within a first communication window by the use of a given communication protocol,
 a second processor configured to perform the second communication event within a second communication window by the use of the given communication protocol or a different communication protocol,
 wireless communication circuitry connected to a radio-frequency antenna configured to transmit and/or receive a packet wirelessly, the wireless communication circuitry being further connected to the second processor, the second processor being configured to perform the second communication event of the packet via the wireless communication circuitry, and the wireless communication circuitry being further connected to the first processor, the first processor being configured to perform the first communication event of the packet via the wireless communication circuitry,
 wherein the second processor is configured to transmit an event signal to the first processor when performing the second communication event, and the first processor is configured to arrange the first communication window with respect to the second communication window based on the event signal so that the interference between the first communication window and the second communication window is minimized when the first processor and the second processor performs the first communication event and the second communication event, respectively, and wherein the first processor is configured to perform the arranging of the first communication window with respect to the second communication window by receiving at the first processor the event signal transmitted by the second processor, initiating a timer in the first processor based on the event signal, where the timer is configured to count a predetermined time period, setting a time range in dependence of the time period, determining whether the event signal is received within the time range, determining a time offset between a receive time of the event signal and the time period, synchronizing continuously a crystal oscillator to the time offset such that in average the offset will be minimized, and arranging at the first processor the first communication window in relation to the second communication window such that the interference between the first communication window and the second communication window is minimized.

2. A wireless communication device according to claim 1, wherein the communication protocol used by the second processor is operating within and same operating frequency as the given communication protocol used by the first processor.

3. A wireless communication device according to claim 2, wherein the operating frequency is between 2.4 GHz and 5.5 GHz, or the operating frequency is defined to be about 2.45 GHz or about 5.5 GHz.

4. A wireless communication device according to claim 3, wherein the first processor is configured to assign the wireless communication circuitry to either the first processor or the second processor.

5. A wireless communication device according to claim 3, wherein the first processor is configured to assign the wireless communication circuitry to either the first processor or the second processor based on the arrangement of the first communication window with respect to the second communication window.

6. A wireless communication device according to claim 2, wherein the first processor is configured to assign the wireless communication circuitry to either the first processor or the second processor.

7. A wireless communication device according to claim 2, wherein the first processor is configured to assign the wireless communication circuitry to either the first processor or the second processor based on the arrangement of the first communication window with respect to the second communication window.

8. A wireless communication device according to claim 1, wherein the first processor is configured to assign the wireless communication circuitry to either the first processor or the second processor.

9. A wireless communication device according to claim 8, wherein the first processor is configured to assign the wireless communication circuitry to either the first processor or the second processor based on the arrangement of the first communication window with respect to the second communication window.

10. A wireless communication device according to claim 1, wherein the first processor is configured to assign the wireless communication circuitry to either the first processor or the second processor based on the arrangement of the first communication window with respect to the second communication window.

11. A wireless communication device according to claim 1, wherein the first processor is configured to assign the wireless communication circuitry to either the first processor or to the processor according to a prioritization scheme, wherein the prioritization scheme is configured to prioritize the first communication event and the second communication event according to the content of the packet of the first communication event and the content of the event signal or a packet of the second communication event transmitted to the first processor.

12. A wireless communication device according to claim 1, comprising one or more microphones, wherein the first processor is connected to the one or more microphones for generating a packet to be transmitted to the second processor, and the second processor is configured to decode the packet and transmit the packet via the wireless communication circuitry and the antenna to an external device if the wireless communication circuitry has been assigned to the second processor.

13. A wireless communication device according to claim 1, comprising other processor, wherein the first processor is configured to arrange the first communication window with respect to the second communication window and one or more other communication windows of communication protocol used by each of the other processor, wherein the communication protocol used by each of the other processors is operating within an operating frequency which is the same as for the given communication protocol.

14. A method for arranging a first communication window of a first processor using a given communication protocol and a second communication window of a second processor using the given communication protocol or a different communication protocol, when transmitting or receiving a packet at a radio-frequency antenna connected to a wireless communication circuitry, the wireless communication circuitry being further connected to the first processor and the second processor, wherein the method comprising;

performing at the second processor the second communication event within the second communication window by the use of the given communication protocol or the different communication protocol, transmitting an event signal at the second processor to the first processor, arranging at the first processor the first communication window with respect to the second communication window based on the event signal so that the interference between the first communication window and the second communication window is minimized when the first processor and the second processor perform the first communication event and the second communication event, respectively, wherein the first processor is configured to perform the arranging of the first communication window with respect to the second communication window by receiving at the first processor the event signal transmitted by the second processor, initiating a timer in the first processor based on the event signal, where the timer is configured to count a predetermined time period, setting a time range in dependence of the time period, determining whether the event signal is received within the time range, determining a time offset between a receive time of the event signal and the time period such that in average the offset will be minimized, synchronizing continuously a crystal oscillator to the time offset, and arranging at the first processor the first communication window in relation to the second communication window such that the interference between the first communication event and the second communication event is minimized.

15. A method according to claim 14, wherein receiving at the second processor the packet transmitted by the wireless communication circuitry, and wherein the second processor transmits via a first decoder of the second processor the packet to a second decoder of the first processor.

16. A method according to claim 14, wherein assigning at the first processing unit the wireless communication circuitry to either the first processor or the second processor.

17. A method according to claim 14, wherein the first processor is configured to assign the wireless communication circuitry to either the first processor or the second processor based on the arrangement of the first communication window with respect to the second communication window.

18. A method according to claim 14, wherein the first processor is configured to assign the wireless communication circuitry to either the first processor or to the second processor according to a prioritization scheme, wherein the prioritization scheme is configured to prioritize the first communication event and the second communication event according to the contain of the packet of the first communication event and the second communication event.

\* \* \* \* \*